E. H. GOLD.
MEANS FOR ACCELERATING THE FLOW OF MEDIUM THROUGH THE RADIATING CIRCUITS OF STEAM HEATING SYSTEMS.
APPLICATION FILED JULY 31, 1912.
1,162,766.
Patented Dec. 7, 1915.
4 SHEETS—SHEET 1.
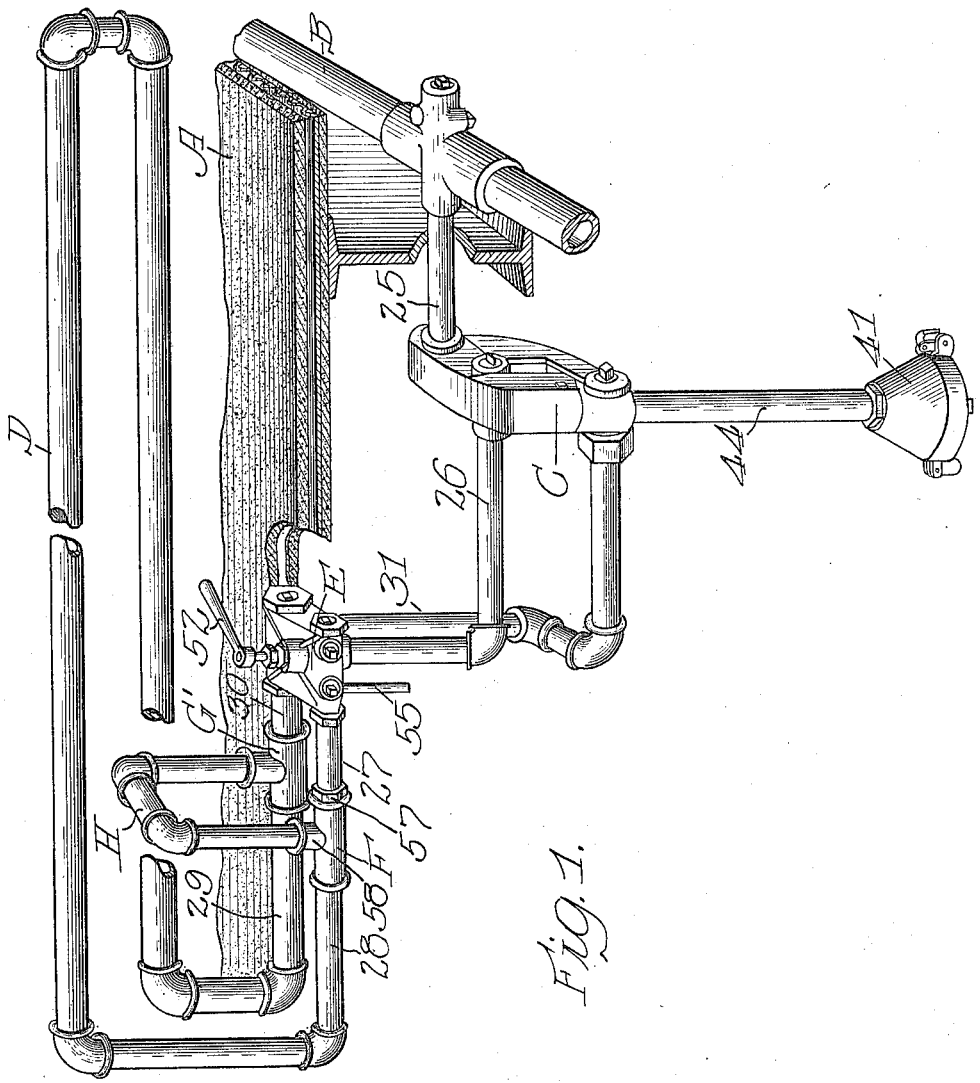

E. H. GOLD.
MEANS FOR ACCELERATING THE FLOW OF MEDIUM THROUGH THE RADIATING CIRCUITS OF STEAM HEATING SYSTEMS.
APPLICATION FILED JULY 31, 1912.
1,162,766.
Patented Dec. 7, 1915.
4 SHEETS—SHEET 2.
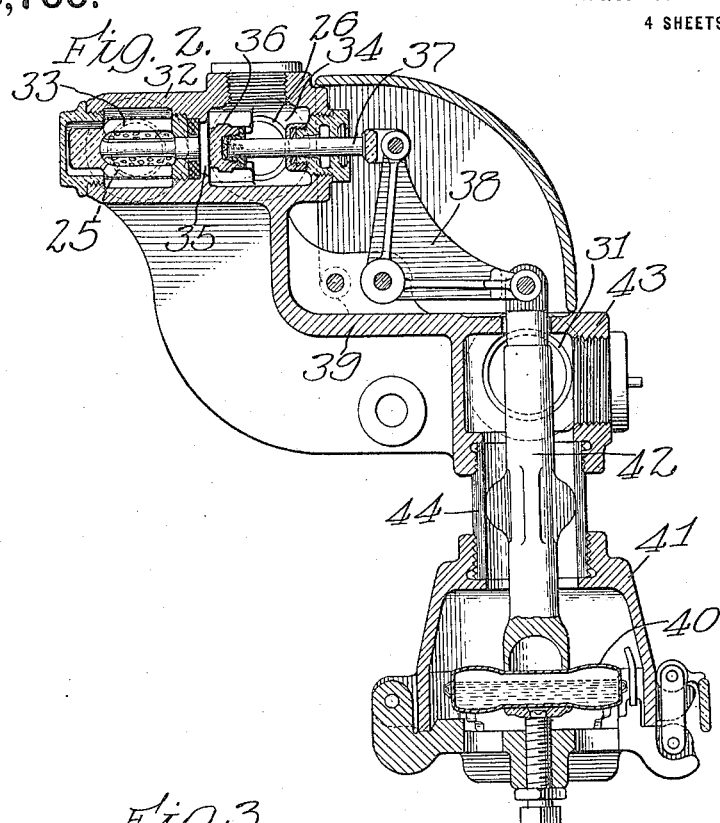
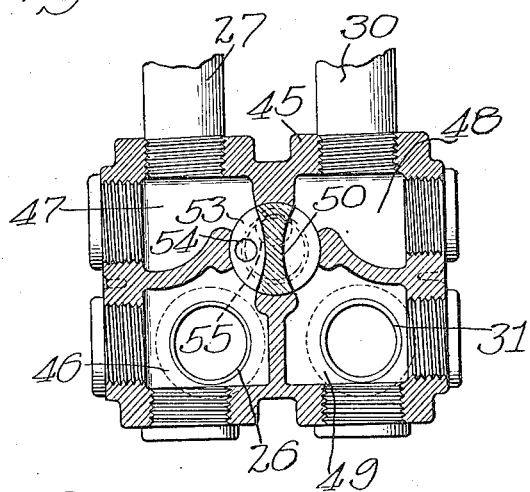

E. H. GOLD.
MEANS FOR ACCELERATING THE FLOW OF MEDIUM THROUGH THE RADIATING CIRCUITS OF STEAM HEATING SYSTEMS.
APPLICATION FILED JULY 31, 1912.
1,162,766.
Patented Dec. 7, 1915.
4 SHEETS—SHEET 3.
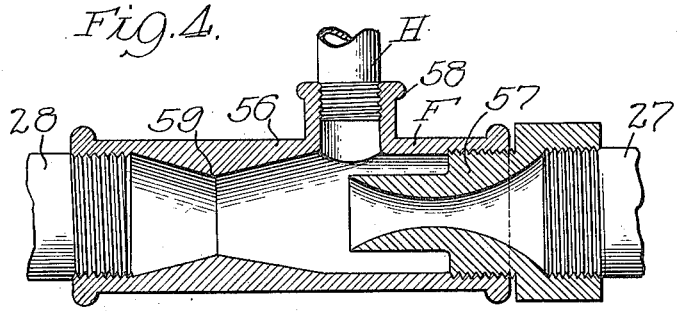
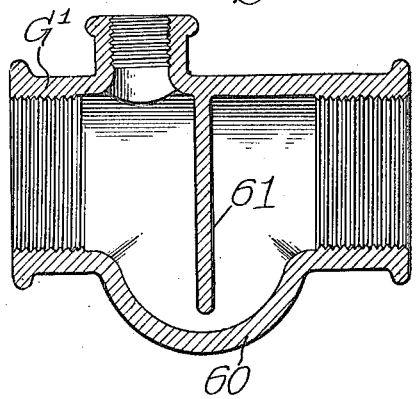
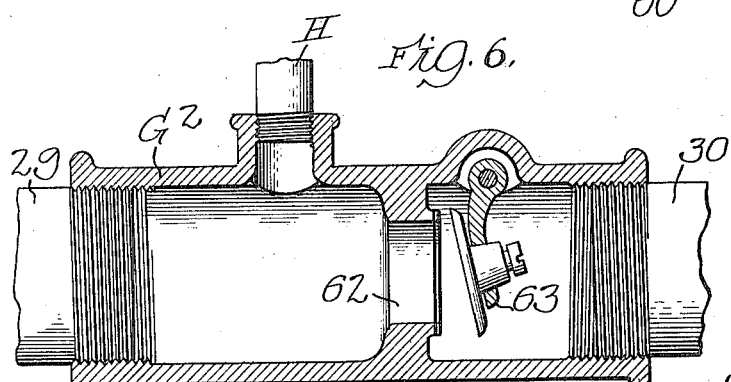

E. H. GOLD.
MEANS FOR ACCELERATING THE FLOW OF MEDIUM THROUGH THE RADIATING CIRCUITS OF STEAM HEATING SYSTEMS.
APPLICATION FILED JULY 31, 1912.
1,162,766.
Patented Dec. 7, 1915.
4 SHEETS—SHEET 4.
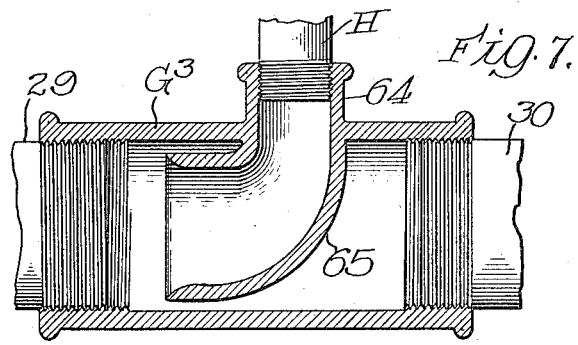
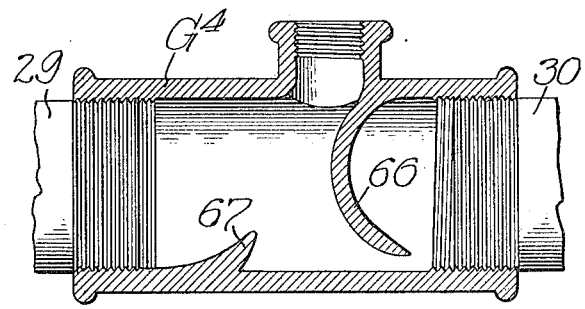
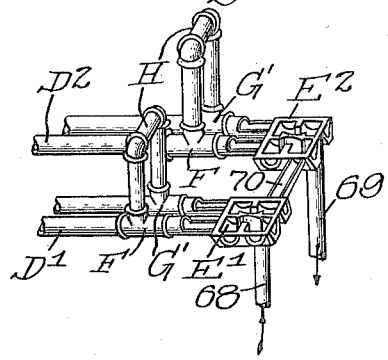
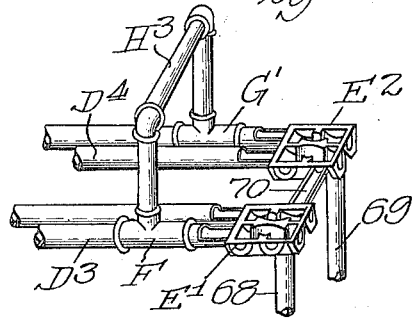

UNITED STATES PATENT OFFICE.

EGBERT H. GOLD, OF CHICAGO, ILLINOIS.

MEANS FOR ACCELERATING THE FLOW OF MEDIUM THROUGH THE RADIATING-CIRCUITS OF STEAM-HEATING SYSTEMS.

1,162,766.   Specification of Letters Patent.   Patented Dec. 7, 1915.

Application filed July 31, 1912. Serial No. 712,564.

*To all whom it may concern:*

Be it known that I, EGBERT H. GOLD, a citizen of the United States, residing at Chicago, in the county of Cook and State of Illinois, have invented certain new and useful Improvements in Means for Accelerating the Flow of Medium Through the Radiating-Circuits of Steam-Heating Systems, of which the following is a specification.

My invention relates to steam heating systems and the principal object of the invention is to provide novel means for causing the medium to pass more rapidly through the radiating circuit or circuits than is the case when the circulation depends entirely upon the pressure of steam exerted at the inlet end of the radiating circuit.

The invention has in view especially the conditions which prevail in the heating of railway cars, and is designed more particularly as an improvement upon the type of car heating systems employing steam at low pressure, for example at substantially atmospheric pressure. In a system of this type the steam taken from the high pressure source, the steam train pipe, is reduced by means of an automatically operated reducing valve and then circulates through a steam coil extending lengthwise through the car, the reducing valve being controlled by a thermostat located at the outlet end of the coil. The steam at the inlet end of the coil being at a pressure not greatly exceeding atmospheric pressure it exerts comparatively little force upon the medium in the coil so that if the steam circuit is a long one and the amount of condensation considerable the circulation is liable to be more sluggish than is desirable.

My present invention provides for the arrangement in the feed pipe of the radiator, beyond the controller, of a nozzle of constricted cross-sectional area which gives the inflowing steam the form of a jet having some velocity and in providing a branch pipe or conduit leading from the neighborhood of the jet to the return end of the coil so that the partial vacuum developed by the jet acts upon the medium in the return end of the radiator.

The invention provides further a device of one sort or another in the discharge end of the radiating coil between the branch pipe and the atmosphere which allows the outflow of water of condensation while preventing air from being drawn in to satisfy the partial vacuum created by the steam jet.

The invention has for a further object to provide a system having the novel features consisting of the new and improved constructions, arrangements and devices which are shown in the drawings hereto annexed and which will be hereinafter more fully described and claimed.

The invention is illustrated in certain preferred embodiments in the accompanying drawings, wherein—

Figure 1 is a diagrammatic view of the system as a whole; Fig. 2, a longitudinal sectional view of a preferred form of automatic controller; Fig. 3, a sectional plan of the four-way valve shown in Fig. 1; Fig. 4, a longitudinal sectional view of the jet-forming device; Figs. 5, 6, 7 and 8 are similar views illustrating different forms of fittings which may be employed in the discharge end of the radiating coil for permitting the outflow of condensation while preventing the inflow of air at such time as suction is being exerted by the jet; Fig. 9, a diagrammatic view illustrating one application of my invention to a system employing two radiating coils arranged so that they are in series when both are in service; and Fig. 10 a similar view of a modified arrangement for the same sort of multiple coil system.

Like characters designate like parts in the several figures of the drawings.

Referring to the drawings, A designates the flooring of the car, B the train pipe, C the thermostatic controller, D the radiating coil, E a four-way valve the function of which is to cut out the radiator and short-circuit the steam to the thermostat of the controller, F (Fig. 4) the jet-forming fitting in the feed pipe of the radiator, G', G², G³ and G⁴ (see Figs. 5 to 8, inclusive), different forms of fittings interposed in the return end of the radiator, and H the pipe connecting fitting F with the fitting G', etc., as the case may be.

The feed pipe for the radiator consists, in the system illustrated in Fig. 1, of the pipe sections 25, 26, 27, 28. The return conduit of the radiating coil is made up of the pipe sections 29, 30 and 31.

Any suitable form of vapor regulator may be employed. Fig. 2 shows a familiar form of device, 32 designating a casing divided into a high pressure chamber 33 connected with the train pipe B by the pipe section 25, and 34 a low pressure chamber from which leads the feed pipe section 26, these chambers communicating by a port 35 controlled by a valve 36 the stem of which 37 is connected with a bell crank 38 pivoted to a web 39 formed on the under side of casing 32.

40 designates a thermostat located within a casing 41, and 42 an operating rod which bears on the top of the thermostat and is connected with the bell crank 38. The return pipe section 31 communicates with a chamber in the casing 43 formed on the web 39. Casing 41 is secured to the end of a pipe 44 tapped into the casing 43.

The four-way valve E consists of a casing 45 divided into four chambers: 46 to which feed pipe section 26 leads, 47 communicating with feed pipe section 27, 48 to which the return pipe section 30 leads, and 49 which communicates with the return pipe section 31. These chambers are put into communication with each other by means of the rotary valve 50 having a stem 51 and handle 52, the bottom of the valve being in the form of a disk 53 having a perforation 54 communicating with the drip pipe 55 when the valve is in position to put chamber 47 in communication with chamber 48 and chamber 46 in communication with chamber 49, that is when the radiating coil is cut out and the steam supply short-circuited to thermostat 40.

The jet-forming device F consists of a T-fitting 56 into one end of which the pipe 28 is threaded and a nozzle fitting 57 into which the feed pipe section 27 is threaded. The suction pipe H leads from the branch 58 of fitting 56 and the bore of the fitting is preferably narrowed beyond this point by thickening the wall as indicated at 59.

A fitting is employed for connecting the suction pipe H with the return end of the radiating coil which is provided with means preventing or checking the inflow of air while permitting the outflow of water of condensation.

In Fig. 5 the fitting G' is shown as formed with the bulge or depression 60 and with the web 61 which projects down into this depression. The water of condensation outflowing from the radiator forms a water seal which prevents the inflow of air backwardly through the outlet end of the coil thereby directing the suction against the medium—steam and water of condensation—in the coil.

In Fig. 6 the fitting G² is provided with a port 62 adapted to be closed by a pivoted gravity valve 63 which is drawn to its seat by the suction produced through the pipe H.

In Fig. 7 a fitting G³ is shown in which the branch 64 to which pipe H is connected has the extension 65 within the fitting, the extension preferably being flared and having its opening toward the pipe section 29. The water of condensation can escape through the space around the extension 65. The suction in pipe H is however, to a very large extent at least, directed against the medium in the radiator.

A somewhat similar arrangement is shown in Fig. 8 in which the fitting is formed with the backwardly curved downwardly projecting web 66 and preferably also with the upwardly projecting web 67.

The operation of the system above described is as follows: High pressure steam passes from the train pipe B through the pipe section 25 into the high pressure chamber 33 and thence, past valve 36, into the low pressure chamber 34, pipe section 26, chambers 46, 47 of the four-way valve, pipe section 27 and into the nozzle 57. The constriction of the bore of the nozzle delivers the steam into the fitting 56 in the form of a jet having some velocity. This produces a partial vacuum in the pipe H and in the fitting G' or whichever fitting may be used. The vacuum operates to suck the water and steam from the radiating coil D and thus hastens the circulation through the coil and prevents any pocketing of water or air. By the employment of any of the fittings G', G², G³ and G⁴ the suction produced by the jet is directed entirely or to a very large extent against the medium in the coil D. If some such contrivance as is provided by these fittings were not used a part of the suction produced by the jet would be wasted because the jet would in such case act to suck up air through the outlet end of the system.

It will be understood that the medium in outflowing through pipe section 30, chambers 48, 49 of the four-way valve and pipe section 31 eventually comes into contact with the thermostat 40. If the medium is in the form of steam when it reaches the thermostat, the thermostat is expanded to close or partially close the pressure reducing valve 36 and so diminish the supply of steam to the system. The automatic maintenance of atmospheric pressure in the coil B is effected in this manner.

The radiator is put out of service by turning the valve 50 of the four-way valve device F so as to put chamber 47 in communication with chamber 48, chamber 46 in communication with chamber 49 and drip port 54 in communication with the drip pipe 55. The radiator drains through port 54 and pipe 55 and steam passing the reducing valve is short-circuited to the thermostat, the valve being automatically adjusted so as to allow just enough steam to pass to keep the thermostat hot.

In Fig. 9 I have shown one application of my present invention to what may be termed a multiple coil heating system in which two heating coils are employed which may be used separately or together, the arrangement being such that when both coils are used the circulation is through them in series. D' D² designate the coils, 68 the common supply pipe and 69 the common discharge pipe for the coils. The coils are connected together and with the supply and discharge pipes by means of four-way valves E', E² similar in construction to the four-way valves previously described, the valves being connected by a section of pipe 70. The inlet end of each coil is provided with a jet-forming device F connected by the branch pipe H with one of the fittings G', etc.

In Fig. 10 the arrangement is the same except that only one of the coils, the coil D³, is provided with the jet nozzle F, the branch pipe H³ extending to the return end of the other coil D⁴. If both coils are supplied the medium flows through them in series as described above in connection with Fig. 10. In such case the steam circuit is a long one and hence the need for additional means for promoting circulation is enhanced. If only one of the coils is in service this means becomes ineffective, but the suction developed is utilized for ridding the other coil of water of condensation through the drainage outlet (54, 55, Fig. 3) which is opened when the valve E² is set so as to cut out the coil D⁴.

While I have described my invention in certain preferred embodiments, it will be readily understood that modifications might be devised without departure from the invention. Therefore, I do not wish to be understood as limiting the invention to the particular devices, arrangements and constructions described and claimed.

I claim:

1. In a steam heating system the combination with a source of supply of steam, of a system of radiating pipes comprising two coils, a switching mechanism whereby the steam may be circulated through one of said coils alone or through both the coils in series and which in the first named alternative provides a drainage outlet for the coil cut out, a nozzle in the inlet end of one of said coils, and means constituting a conduit leading from a point adjacent said nozzle to the return end of the other coil.

2. In a steam heating system the combination with a source of supply of steam, of a system of radiating pipes comprising two coils, apparatus whereby one of said coils may be cut off from the source of supply and put in communication with the outer air, a conduit leading from a point adjacent the intake of that coil receiving steam to a point adjacent the outlet of the coil cut out, and means actuated by steam passing to the coil receiving steam for creating a movement of fluid in the coil cut out.

3. In a steam heating system the combination with a source of supply of steam, of a system of radiating pipes comprising a plurality of coils, apparatus for cutting off communication between the source of supply and certain of said coils and putting them in communication with the outer air while maintaining such communication with a source of steam supply as to the remaining coils, and means actuated by steam passing to those coils not cut out for creating movement of fluid within the coils cut out.

4. In a steam heating system the combination with a source of supply of steam, of a system of radiating pipes comprising a plurality of coils, a switching mechanism operable to cut off communication between the source of supply and certain of said coils while maintaining such communication with respect to the remainder of said coils, said mechanism being adapted in such case to open communication between both ends of the coils cut out and the outer air, and means actuated by the steam passing to the coils receiving steam whereby movement of fluid is set up in the coils cut out.

5. A heating system comprising a substantially horizontally disposed radiating pipe coil, portions of the ends of which lie adjacent to each other, the discharge end being open to the atmosphere, means for introducing steam into said coil and maintaining the same at substantially atmospheric pressure consisting of an inlet valve at one end of the coil and a thermostat controlling the same which is arranged at the open discharge end of the coil, a pipe providing a free unobstructed by-pass between the adjacently disposed portions of the inlet and discharge ends of the coil, a steam nozzle in the inlet end of the coil to produce a steam jet adapted to exert suction through said by-pass directly upon the medium in the discharge end of the coil, and means in the discharge end of the coil between said by-pass and the atmosphere which permits the outflow of water of condensation but checks inflow of air while the system is in operation.

EGBERT H. GOLD.

Witnesses:
L. A. FALKENBERG,
G. Y. SKINNER.